United States Patent [19]

Thomas

[11] Patent Number: 5,082,412
[45] Date of Patent: Jan. 21, 1992

[54] ROOFING WASHER

[75] Inventor: Louis Thomas, Maywood, Ill.

[73] Assignee: Illinois Tool Works Inc., Glenview, Ill.

[21] Appl. No.: 621,314

[22] Filed: Dec. 3, 1990

[51] Int. Cl.[5] .................... F16B 33/00; F16B 43/00
[52] U.S. Cl. ......................... 411/533; 411/368; 411/915; 52/410
[58] Field of Search ............... 411/368-370, 411/531, 533, 915; 52/410, 512

[56] References Cited

U.S. PATENT DOCUMENTS

| | | | |
|---|---|---|---|
| 4,663,910 | 5/1987 | Hasan | 411/533 |
| 4,712,959 | 12/1987 | Hasan | 411/533 |
| 4,757,661 | 7/1988 | Hasan | 411/533 |
| 4,799,845 | 1/1989 | Hrysko | 52/410 |
| 4,884,932 | 12/1989 | Meyer | 411/533 |
| 4,930,959 | 6/1990 | Jagelid | 411/533 |

Primary Examiner—Neill R. Wilson
Attorney, Agent, or Firm—Schwartz & Weinrieb

[57] ABSTRACT

A roofing washer useful with a fastener having a head and a shank, such as, for example, a roofing screw, and provided with an annular lip so as to restrain the head after the head has been driven past the annular lip is disclosed. As molded from a resilient, polymeric material, the roofing washer has a plurality of discrete cavities, which facilitate radial expansion of the annular lip, and a plurality of discrete ribs, which separate the discrete cavities. In one possible embodiment, each cavity has an inner, generally cylindrical wall, an outer, generally cylindrical wall, and two end walls, each defining a plane oriented at an acute angle relative to a radial plane. In a different embodiment, each cavity has two planar walls and a curved wall whereby the cavities have substantially triangular configurations.

24 Claims, 4 Drawing Sheets

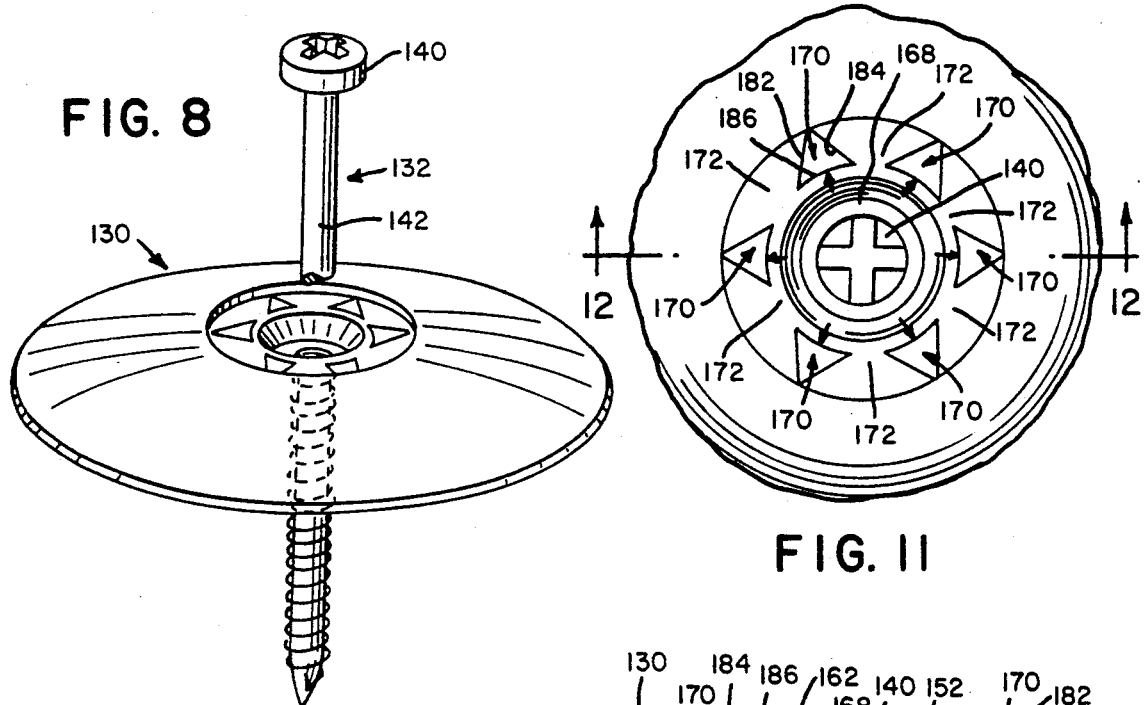
FIG. 8
FIG. 11
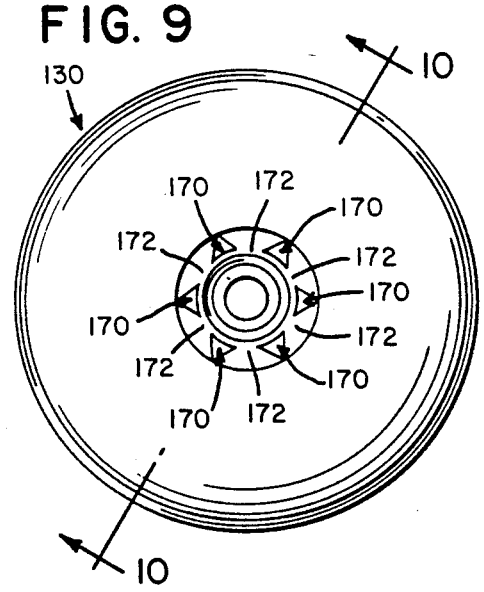
FIG. 9
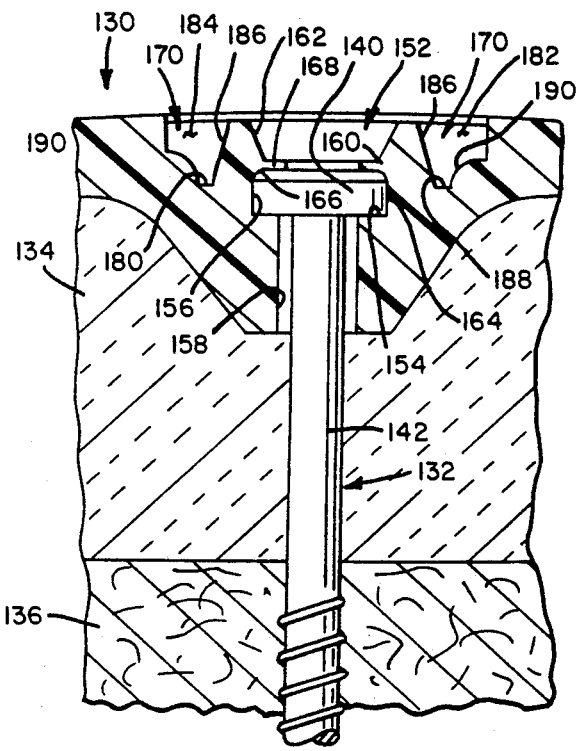
FIG. 12
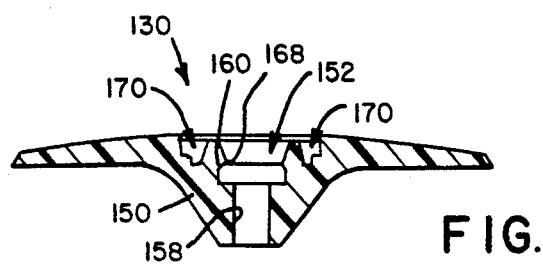
FIG. 10

ROOFING WASHER

TECHNICAL FIELD OF THE INVENTION

This invention relates to a roofing washer which is useful with a fastener having a head and a shank, such as, for example, a roofing screw, so as to fasten a blanket of roofing insulation to a roofing deck. The roofing washer has improved features for restraining the head of the fastener so as to limit backward movement of the fastener relative to the roofing washer.

BACKGROUND OF THE INVENTION

It is common to use a roofing washer with a fastener having a head and a shank, such as, for example, a roofing screw, so as to fasten a blanket of roofing insulation to a roofing deck. Typically, the roofing washer in its entirety is molded from a polymeric material, such as, for example, polypropylene. Alternately, the roofing washer is stamped from sheet metal, such as, for example, galvanized steel, whereupon the roofing washer may have a central insert molded from such a polymeric material.

As disclosed in Hasan U.S. Pat. Nos. 4,663,910, 4,712,959, and 4,757,661, it is known for the roofing washer to have a restraining formation, such as, for example, an annular lip, for restraining the head of a fastener, with which the roofing washer is used, so as to limit backward movement of the fastener relative to the roofing washer. Moreover, as disclosed in Hasan U.S. Pat. No. 4,757,661, it is known for the roofing washer to have axially disposed ribs arranged in a generally spiral configuration for coacting with such a lip.

Other roofing washers having various features for restraining fasteners against backward movement are disclosed in Sandquist U.S. Pat. No. 4,074,501, Dewey U.S. Pat. No. 4,545,270, and Reinwall U.S. Pat. No. 4,630,984.

This invention provides a roofing washer having improved features for restraining a fastener head against backward movement relative to the roofing washer.

SUMMARY OF THE INVENTION

This invention provides a roofing washer which is useful with a fastener having a head and a shank, such as, for example, a roofing screw, so as to fasten a blanket of roofing insulation to a roofing deck. The roofing washer has improved features for restraining the head of the fastener so as to limit backward movement of the fastener relative to the roofing washer.

The roofing washer has a central portion molded from a resilient, polymeric material, such as, for example, polypropylene, which is preferred. The roofing washer may be entirely molded from such a polymeric material. Alternatively, the washer may consist of an annular metal stamping and a central portion of polymeric material secured to the metal stamping.

The central portion has a central socket, which has a lower wall and a lateral wall, and defines a longitudinal axis. The lower wall has an axial aperture, which is configured so as to permit the fastener shank to extend through the axial aperture but not to permit the fastener head to pass therethrough. The lateral wall encloses the central socket and defines an annular lip.

The annular lip engages the fastener head when the fastener is driven into a substrate with the fastener shank extending through the axial aperture. The annular lip is radially expanded as the fastener head is driven past the annular lip. The annular lip restrains the fastener head, after such head has been driven past the annular lip, so as to limit backward movement of the fastener relative to the roofing washer.

Preferably, the annular lip is defined by means of surface portions of the lateral wall. These surface portions include an upper, frusto-conical surface flaring upwardly, a lower, generally cylindrical surface extending upwardly from the lower wall, and an intermediate surface between the upper and lower surfaces.

The roofing washer is distinguishable from known roofing washers including those exemplified in the aforenoted patents by having a plurality of discrete cavities arrayed in a regular pattern around the central socket. The cavities facilitate radial expansion of the annular lip, by accommodating some of the component portions of near the annular lip, when the head of the fastener is driven past the annular lip. The annular lip is reinforced by means of the material of the central portion defined between the cavities.

In one embodiment, each cavity has an inner wall conforming generally to a cylindrical section, an outer wall conforming generally to a cylindrical section, and two end walls. Preferably, each end wall defines a plane, which is oriented at an acute angle relative to a radial plane, that is, to a plane comprising the axis defined by means of the central socket. Preferably, moreover, the plane defined by means of each end wall is displaced from a radial plane by means of an acute angle, in a counterclockwise sense when the roofing washer is viewed from above.

In an alternate embodiment, each cavity has first, second, and third walls. The first and second walls are planar and meet at an acute angle. Preferably, the third wall is curved about an axis, which is substantially coaxial with the axis defined by means of the lateral wall defining the central socket, and which intersects the first and second walls at an acute angle. Preferably, moreover, each cavity is symmetrical with respect to a radial plane intersecting the juncture of the first and second walls of such cavity.

According to a further aspect of this invention, the roofing washer may comprise an annular lip and an integral, annular web, which extends radially inwardly from the restraining lip. The web is adapted to overlie portions of the fastener head when the fastener head is disposed within the central socket with the fastener shank extending through the axial aperture.

BRIEF DESCRIPTION OF THE DRAWINGS

These and other objects, features, and advantages of this invention will become evident from the following description of several different embodiments of this invention with reference to the accompanying drawings, in which like reference characters designate like or corresponding parts throughout the several views, and wherein:

FIG. 8 is a perspective view of a roofing washer constituting another embodiment of this invention, as associated with a roofing screw.

FIG. 9, on a smaller scale compared to that of FIG. 8, is a plan view of the roofing washer shown in FIG. 8, apart from the roofing screw.

FIG. 10 is a sectional view taken along line 10—10 of FIG. 9, in a direction indicated by means of the arrows.

FIG. 11, on a larger scale compared to that of FIG. 8, is a fragmentary, plan view of the roofing washer shown in FIGS. 8, 9 and 10, as associated with the roofing screw shown in FIG. 6.

FIG. 12 is a fragmentary, sectional view taken along line 12—12 of FIG. 11, in a direction indicated by means of the arrows.

DETAILED DESCRIPTION OF ILLUSTRATED EMBODIMENTS

Figure 1:
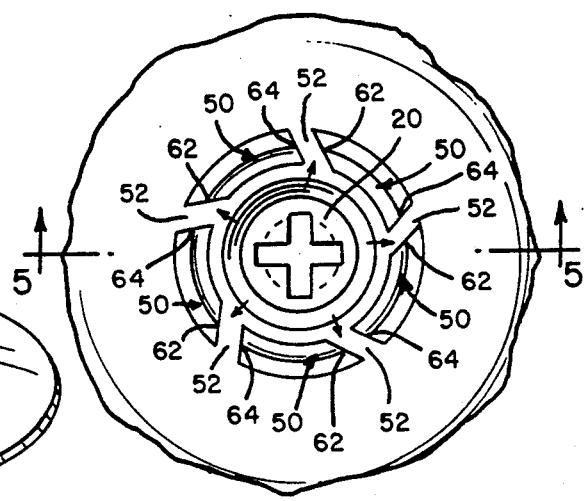
FIG. 1 is a perspective view of a roofing washer constituting one possible embodiment of this invention, as associated with a roofing screw.
Figure 4:
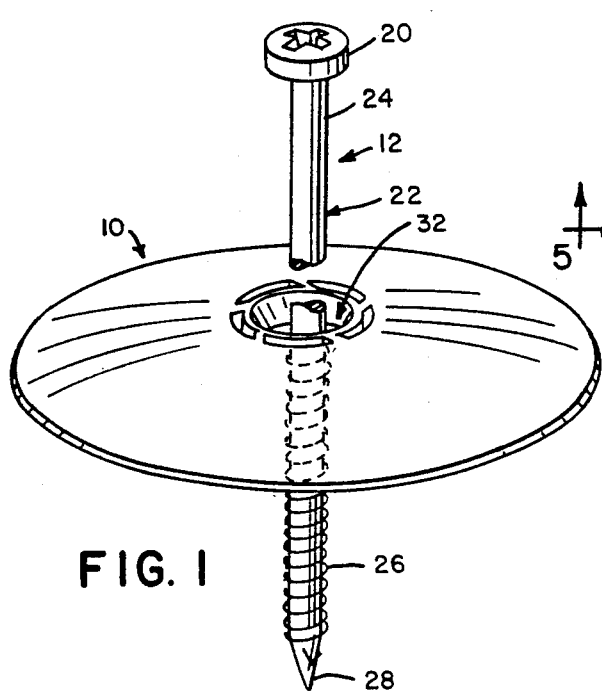
FIG. 4, on a larger scale compared to that of FIG. 1, is a fragmentary, plan view of the roofing washer shown in FIGS. 1, 2, and 3, as associated with the roofing screw shown in FIG. 1.
Figure 2:
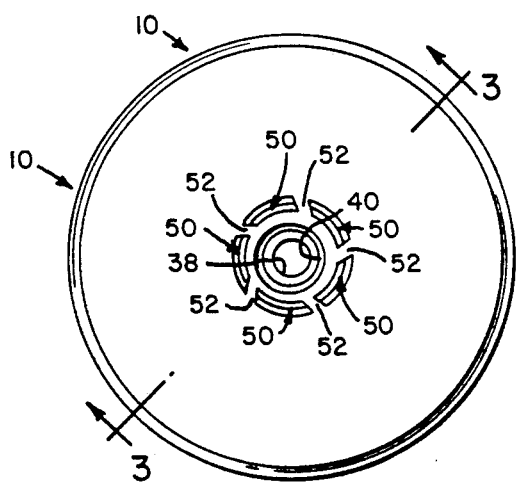
FIG. 2, on a smaller scale compared to that of FIG. 1, is a plan view of the roofing washer shown in FIG. 1, apart from the roofing screw.
Figure 5:
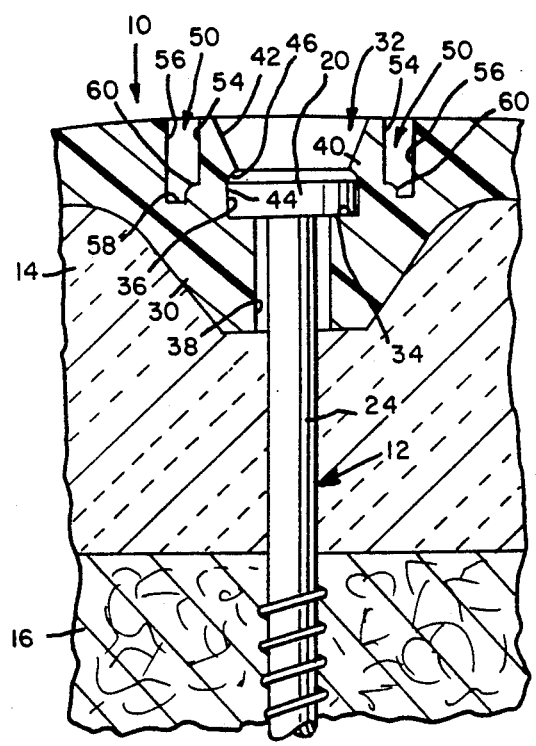
FIG. 5 is a fragmentary, sectional view taken along line 5—5 of FIG. 4, in a direction indicated by means of the arrows.
Figure 3:
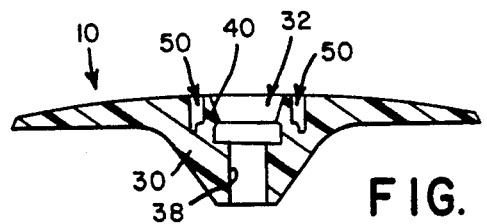
FIG. 3 is a sectional view taken along line 3—3 of FIG. 2, in a direction indicated by means of the arrows.

Although various embodiments of this invention are illustrated in the drawings and are to be next described, it should be here understood that these embodiments are exemplary and that this invention is not necessarily limited to such embodiments.

As shown in FIGS. 1 through 5, a roofing washer 10 constituting one possible embodiment of this invention is useful with a roofing screw 12 to fasten a blanket 14 of roofing insulation to a roofing deck 16. The washer 10 has improved features for restraining the screw 12 against backward movement relative to the washer 10.

Generally, the screw 12 has a head 20 and a shank 22, which has an upper, unthreaded portion 24, a lower, threaded portion 26 with a right-hand thread, and a self-drilling tip 28. As shown, the head 20 is slotted so as to receive a driving tip (not shown) of a driving tool, such as, for example, a manual or powered screwdriver. Further details of the head 20 are described below. Suitable roofing screws are available commercially from ITW-Buildex (a division of Illinois Tool Works Inc.) of Itasca, Ill., under its ACCUTRAXX TM trademark.

As shown, the blanket 14 is a semi-rigid slab of fibrous insulation. A blanket of roofing insulation of another type, such as, for example, a semi-rigid slab of foamed insulation, may be alternatively used. As shown, the deck 16 is a wooden deck. A roofing deck of another type, such as, for example, a roofing deck made from corrugated steel, may be alternatively used. Suitable materials for the blanket 14 of roofing insulation and for the roofing deck 16 are available commercially from various sources.

The washer 10 in its entirety is molded from a resilient, polymeric material. Polypropylene is a preferred material for the roofing washer 10.

The roofing washer 10, which has an overall shape resembling an inverted, shallow dish, has a central, frusto-conical portion 30 having a central socket 32, which has a lower wall 34 and a lateral wall 36. The socket 32 defines a longitudinal axis. The lower wall 34 has an axial aperture 38, which is configured to permit the screw shank 22 to extend through the axial aperture 38 but not to permit the screw head 20 to pass through the aperture 38.

The lateral wall 36 defines an annular lip 40, which is defined by means of an upper, frusto-conical surface 42 flaring upwardly, a lower, generally cylindrical surface 44 extending upwardly from the lower wall 34, and an intermediate, annular surface 46 connecting the upper surface 42 and the lower surface 44. As shown, the intermediate surface 46 is concave. These surfaces 42, 44, 46, which define the lip 40, are annular surfaces of the lateral wall 36. The lip 40 defines a circular passage when the lip 40 is unstressed.

The head 20 of the roofing screw 12 has a diameter which is greater than the diameter of the passage defined by means of the lip 40 when the lip 40 is unstressed. Moreover, the diameter of the head 20 is approximately equal to the diameter of the generally cylindrical surface 44 of the lateral wall 36. Furthermore, the head 20 has a thickness which is approximately equal to the height of such surface 44. Consequently, the head 20 is adapted to be snugly embraced by means of such surface 44 and to be seated upon the lower wall 34 when the head 20 is contained within the socket 32 with the shank 22 extending through the axial aperture 38. Although the head 20 is shown to conform substantially to a cylindrical solid, the head 20 may have a different shape, so long as the head 20 can be effectively restrained within the socket 32, by means of the annular lip 40.

The lip 40 is adapted to engage the screw head 20, along the upper frusto-conical surface 42, when the roofing screw 12 is driven forwardly with the screw shank 22 extending through the aperture 38. Because of the resilient material of the roofing washer 10, the lip 40 is adapted to be radially expanded so as to permit the head 20 to be driven forwardly past the lip 40. The head 20 exerts camming forces against the upper, frusto-conical surface 42, as the screw 12 is driven forwardly. The lip 40 is adapted to restrain the head 20 within the socket 32, after the head 20 has been driven past the lip 40, so as to limit backward movement of the screw 12 relative to the washer 10. Broadly, therefore, the lip 40 functions as the analogous lips of roofing washers known heretofore have functioned.

However, the washer 10 is distinguishable from roofing washers known heretofore in that the central portion 30 has five discrete cavities 50, which are arrayed in a regular pattern (at approximately 72° intervals) around the central socket 32. The cavities 50 are spaced radially from the socket 32. Moreover, the washer 10 has five discrete ribs 52, which are disposed so as to separate the cavities 50 from one another.

Each cavity 50 has an inner wall 54 conforming generally to a cylindrical section, an outer wall 56 conforming generally to a cylindrical section, a bottom wall 58 including a curved step 60 spaced radially from the outer wall 56, and two end walls 62, 64. The inner wall 54 and the outer wall 56 may be slightly flared as an artifact resulting from the washer 10 being molded. Each of the end walls 62, 64, defines a plane displaced from a radial plane by means of an acute angle, preferably approximately 30°. The plane defined by means of each of the end walls 62, 64, is displaced from a radial plane by means of the aforenoted angle, in a counterclockwise sense when the washer 10 is viewed from above as in FIGS. 2 and 4. If the screw 12 were to have a left-hand thread, rather than a right-hand thread, the plane defined by means of each of the end walls 62, 64, would be displaced in a clockwise sense when the washer 10 is viewed from above.

The cavities 50 facilitate radial expansion of the restraining lip 40, by accommodating some of the resilient material of the lip 40 as the head 20 of the screw 12 is driven past the lip portion 40 with the shank 22 extending through the aperture 38. The ribs 52 reinforce the lip 40. Because the end walls 62, 64, of the cavities 50 define planes displaced from radial planes, as described above, the ribs 52 tend to flex (by means of the a manner suggested in phantom lines in FIG. 4) so as to permit the cavities 50 to accommodate some of the resilient material of the lip portion 40 as the lip 40 is expanded radially.

Figure 6:
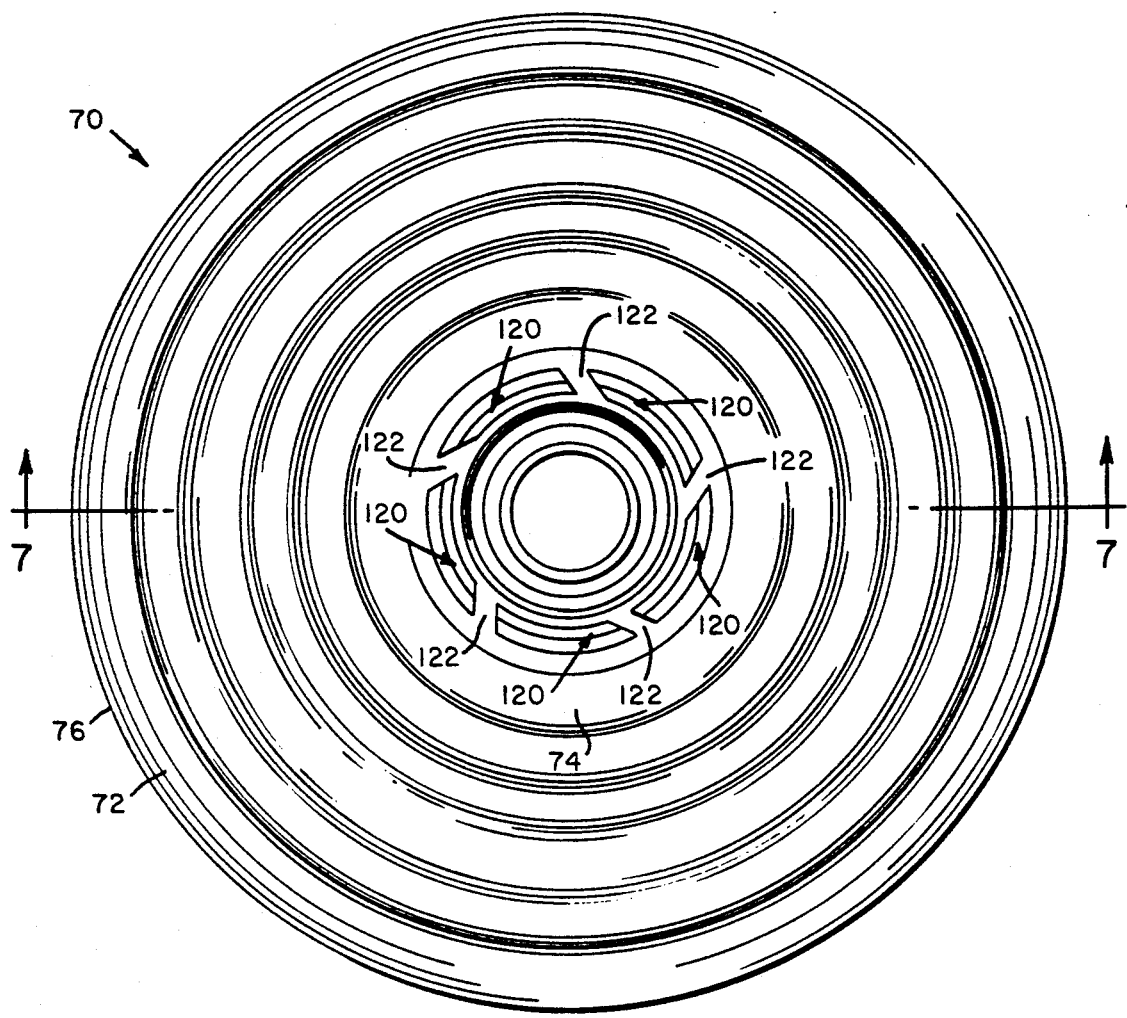
FIG. 6 is a plan view of a roofing washer constituting yet another embodiment of this invention.
Figure 7:
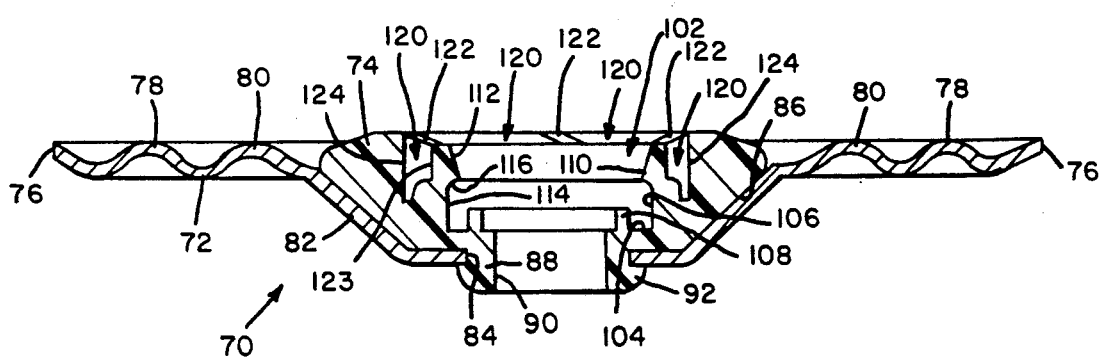
FIG. 7 is a sectional view analogous to FIGS. 3, but taken through the roofing washer shown in FIG. 6 along the line 7—7 of FIG. 6.

As shown in FIGS. 6 and 7, a roofing washer 70 constitutes another embodiment of this invention. The washer 70 is useful with a roofing screw (not shown) similar to the roofing screw 12 so as to fasten a blanket (not shown) of roofing insulation similar to the blanket 14 to a roofing deck (not shown) similar to the roofing deck 16.

The washer 70 is a composite assembly of a metal plate 72 and a resilient, polymeric insert 74, which is assembled to the plate 72 so as to constitute a central portion of the washer 70. The plate 72, which has an outer, circular edge 76, is stamped from sheet metal, such as, for example, galvanized steel, which is preferred. The insert 74 is molded from a resilient, polymeric material, such as, for example, polypropylene, which is preferred.

As stamped, the plate 72 has an outer, annular rib 78, an inner, annular rib 80, and a central, bowl-shaped portion 82 with a central aperture 84.

The insert 74 has a lower, exterior surface 86 conforming generally to and fitting snugly into the central portion 82 of the plate 72. The insert 74 has a tubular hub 88 extending through the central aperture 84 of plate 72 and defining an axial aperture 90 and a lower boss 92 securing such insert 74 to the plate 72.

The insert 74 has a central socket 102, which has a lower wall 104 and a lateral wall 106. The socket 102 defines a longitudinal axis. The lower wall 104 includes an annular rib 108, which extends upwardly from the lower wall 104, and merges with the hub 88. The aperture 90 is configured to permit the screw shank to extend through the aperture 90 but not to permit the screw head to pass through the aperture 90.

The lateral wall 106 defines an annular lip 110, which is defined by means of an upper, frusto-conical surface 112 flaring upwardly, a lower, generally cylindrical surface 114 extending upwardly from the lower wall 104, and an intermediate, annular surface 116 connecting the upper surface 112 and the lower surface 114. As shown, the intermediate surface 116 is concave. These surfaces 112, 114, 116, which define the lip 110, are respective surfaces of the lateral wall 106. The lip 110 defines a circular passage when the lip 110 is unstressed.

Except for the fact that the head of a roofing screw used with the washer 70 tends to sit upon the annular rib 108, rather than upon the lower wall 104, the lip 110 is similar to the lip 70 of the roofing washer 10 and functions similarly.

The insert 74 has five discrete cavities 120 and five discrete ribs 122 separating the cavities 120 from one another. Each cavity 120 has, among other walls, an inner, generally cylindrical wall 123 and an outer, generally cylindrical wall 124 extending slightly above the inner wall 123. In other respects, the cavities 120 are similar to the cavities 50 of the roofing washer 10 and function similarly, and the ribs 122 are similar to the ribs 52 of the roofing washer 10 and function similarly.

As shown in FIGS. 8 through 12, a roofing washer 130 constituting yet another embodiment of this invention is useful with a roofing screw 132 so as to fasten a blanket 134 of roofing insulation to a roofing deck 136. The roofing screw 132, which is similar to the roofing screw 12, has a head 140 and a shank 142. The blanket 134 of roofing insulation is similar to the blanket 14 of roofing insulation. The roofing deck 136 is similar to the roofing deck 16.

The washer 130 in its entirety is molded from a resilient, polymeric material. Polypropylene is a preferred material for the roofing washer 130.

The washer 130, which has an overall shape resembling an inverted, shallow dish, has a central, frusto-conical portion 150 having a central socket 152, which has a lower wall 154 and a lateral wall 156. The socket 152 defines a longitudinal axis. The lower wall 154 has an axial aperture 158, which is configured so as to permit the screw shank 142 to pass through the aperture 158 but not to permit the screw head 140 to pass through the aperture 158.

The lateral wall 156 defines an annular lip 160, which is defined by means of an upper, frusto-conical surface 162 flaring upwardly, a lower, generally cylindrical surface 164 extending upwardly from the lower wall 154, an intermediate, annular surface 166, and a thin, annular web 168 extending radially inwardly from the lateral wall 156, between the upper surface 162 and the intermediate surface 166. As shown, the intermediate surface 166 is concave. These surfaces 162, 164, 166, which define the lip 160, are annular surfaces of the lateral wall 156. The restraining lip 160 defines a circular passage when the lip 160 is unstressed.

The lip 160 is adapted to engage the screw head 140, along the upper, frusto-conical surface 162, when the screw 132 is driven forwardly with the shank 142 extending through the aperture 158. Because of the resilient material of the washer 130, the lip 160 is adapted to be radially expanded so as to permit the head 140 to be driven forwardly past the lip 160. The head 140 exerts camming forces against the upper, frusto-conical surface 162, as the screw 132 is driven forwardly. The lip 160 is adapted to restrain the head 140 within the socket 152, after the head 140 has been driven past the lip 160, so as to limit backward movement of the screw 132 relative to the washer 130. The annular web 168, which is adapted to be resiliently expanded so as to permit the head 140 to pass thereby, is adapted to overlie portions of the head 140 when the head 140 is disposed within the socket 152. Broadly, except for the web 168, the lip 160 functions in a manner similar to that of the lip 40 of the roofing washer 10.

The central portion 150 of the washer 130 has six discrete cavities 170, which are arrayed in a regular pattern (at approximately 60° intervals) around the socket 152, and six discrete ribs 172, which are disposed so as to separate the cavities 170 from one another.

Although shaped differently, the cavities 170 correspond generally to the cavities 50 of the roofing washer 10, and the ribs 172 correspond generally to the ribs 52 of the roofing washer 10.

Each cavity 170 has a three lateral walls, namely a first wall 182, a second wall 184, and a third wall 186. The first wall 182 and the second wall 184 are planar and intersect at an acute angle. The third wall 186 is curved about an axis which is coaxial with the axis defined by means of the central socket 152. Moreover, each cavity 170 has a bottom wall 188 having a curved step 190 spaced radially from the third wall 186. Each cavity 170 is symmetrical with respect to a radial plane intersecting the first wall 182 and the second wall 184 where these walls 182, 184, meet at the acute angle.

The cavities 170 facilitate radial expansion of the lip 160, by accommodating some of the resilient material of the lip 160, as the screw head 140 is driven past the lip 160 with the screw shank 142 extending through the aperture 158. The ribs 172 reinforce the lip 160.

Figure 13:
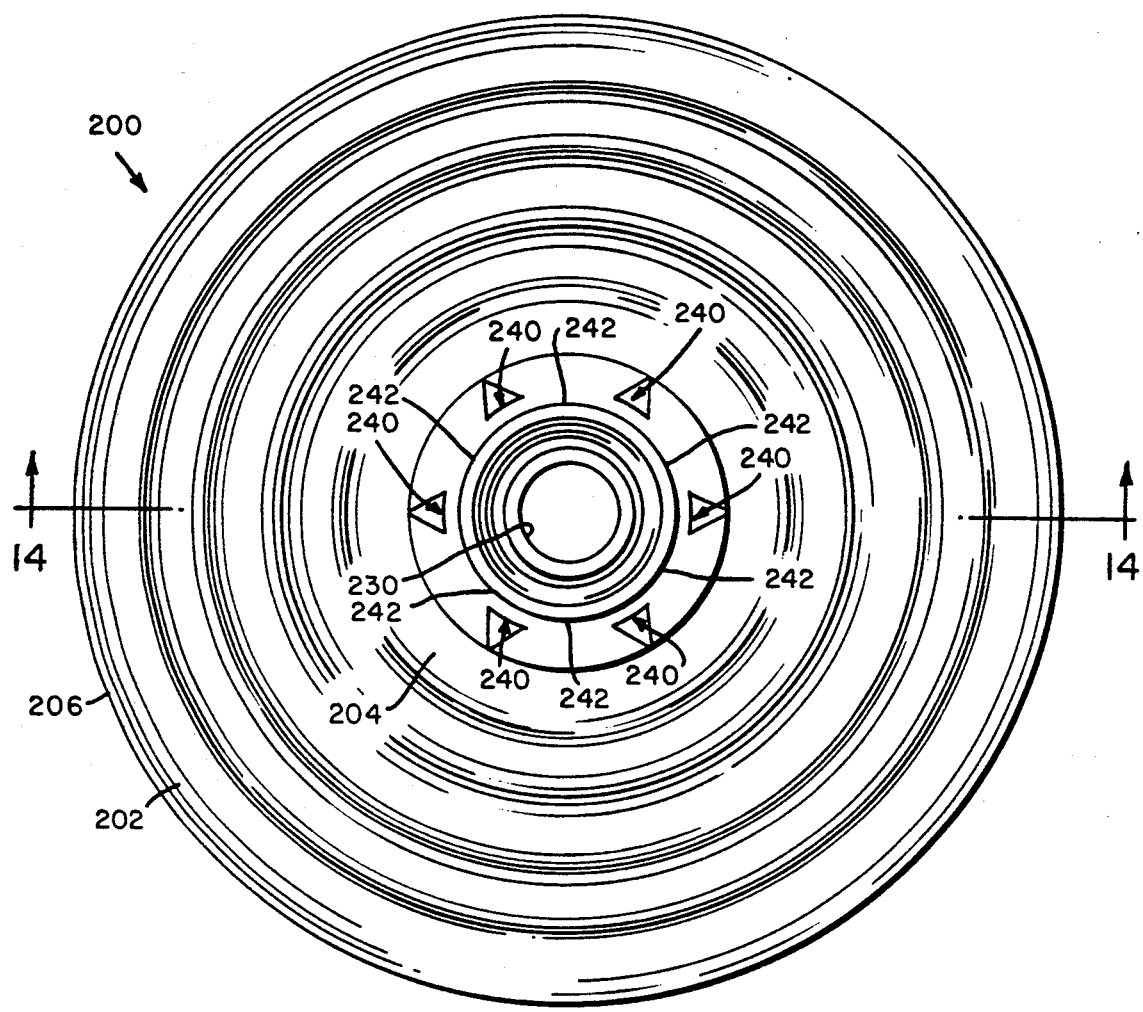
FIG. 13 is a plan view of a roofing washer constituting still another embodiment of this invention.
Figure 14:
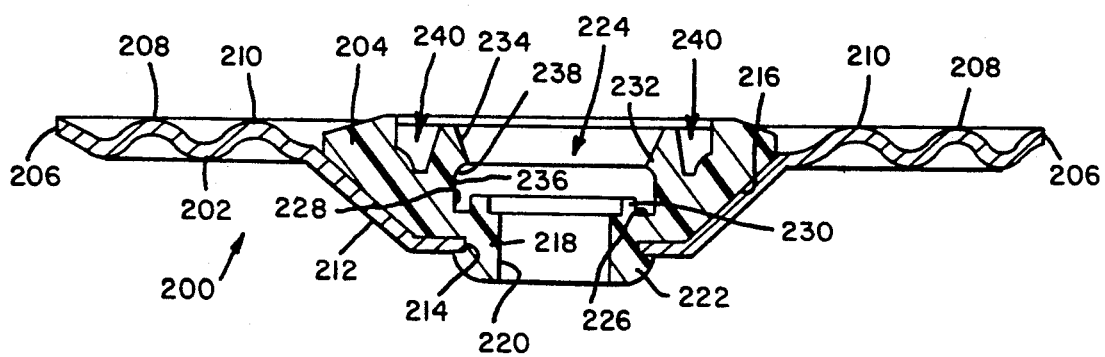
FIG. 14 is a sectional view analogous to FIGS. 3, 7, and 10 but taken through the roofing washer shown in FIG. 13 along the lines 14—14 shown in FIG. 13.

As shown in FIGS. 13 and 14, a roofing washer 200 constitutes still another embodiment of this invention. The washer 200 is useful with a roofing screw (not shown) similar to the roofing screw 12 and the roofing screw 132 so as to fasten a blanket (not shown) of roofing insulation similar to the blanket 14 and the blanket 134 to a roofing deck (not shown) similar to the roofing deck 16 and the roofing deck 136.

The washer 200 is a composite assembly of a metal plate 202, which is similar to the metal plate 72 of the roofing washer 70, and a resilient, polymeric insert 204, which is assembled to the plate 202 so as to constitute a central portion of the washer 200. The plate 202, which has an outer, circular edge 206, is stamped from sheet metal, such as, for example, galvanized steel, which is preferred. The insert 204 is molded from a resilient, polymeric material, such as, for example, polypropylene, which is preferred.

As stamped, the plate 202 has an outer, annular rib 208, an inner, annular rib 210, and a central, bowl-shaped portion 212 with a central aperture 214.

The insert 204 has a lower, exterior surface 216 conforming generally to and fitting snugly into the central portion 212 of the plate 202. The insert 204 has a tubular hub 218 extending through the aperture 214 and defining an axial aperture 220 and a lower boss 222 securing the insert 204 to the plate 202.

The insert 204 has a central socket 224, which has a lower wall 226 and a lateral wall 228. The socket 224 defines a longitudinal axis. The lower wall 226 includes an annular rib 230, which extends upwardly from the lower wall 226, and merges with the hub 218 The aperture 220 is configured so as to permit the screw shank to extend through the aperture 220 but not to permit the screw head to pass through the aperture 220.

The lateral wall 228 defines an annular lip 232, which is defined by means of an upper, frusto-conical surface 234 flaring upwardly, a lower, generally cylindrical surface 236 extending upwardly from the lower wall 226, and an intermediate, annular surface 238 connecting the upper surface 234 and the lower surface 236. As shown, the intermediate surface 238 is concave. These surfaces 234, 236, 238, which define the lip 232, are respective surfaces of the lateral wall 228. The lip 232 defines a circular passage when the lip 232 is unstressed.

Except for the fact that the head of a roofing screw used with the washer 200 tends to sit upon the annular rib 230, rather than upon the lower wall 226, the lip 232 is similar to the lip 70 of the roofing washer 10 and functions similarly.

The insert 204 has six discrete cavities 240 and six discrete ribs 242 separating the discrete cavities 240 from one another. When the insert is compared to the central portion 150 of the roofing washer 130, it is found that the cavities 240 are smaller than the cavities 170, and that the ribs 242 are larger than the ribs 122. In other respects, the cavities 240 are similar to the cavities 170 and function similarly, and the ribs 242 are similar to the ribs 122 and function similarly.

Various modifications may be made to any of the disclosed embodiments without departing from the scope and spirit of this invention. It is therefore to be understood that within the scope of the appended claims, the present invention may be practiced otherwise than as specifically described herein.

I claim:

1. A roofing washer useful with a fastener having a head and a shank, comprising:

a central portion molded from a resilient, polymeric material;

a central socket defined within said central portion and having a lower wall and a lateral wall, and defining a longitudinal axis, said lower wall having an axial aperture configured so as to permit said shank of said fastener to extend through said axial aperture but not to permit said head of said fastener to pass through said axial aperture, said lateral wall defining an annular lip constituting means for engaging said head of said fastener when said fastener is driven with said shank of said fastener extending through said axial aperture, for being expanded radially as said head of said fastener is driven past said annular lip, and for restraining said head of said fastener, after said head of said fastener has been driven past said annular lip, so as to limit backward movement of said fastener relative to said washer; and a plurality of discrete cavities arranged within a regular pattern around said central socket and spaced radially outwardly from said central socket by means of said annular lip, said discrete cavities being separated from each other by means of non-radially extending ribs which interconnect said annular lip to said central portion for facilitating radial expansion of said annular lip by accommodating portions of said annular lip, as said head of said fastener is driven past said annular lip with said shank of said fastener extending through said axial aperture, said annular lip being reinforced by said ribs defined between said cavities.

2. The roofing washer of claim 1 wherein the lateral wall has a frusto-conical surface above the annular lip.

3. The roofing washer of claim 1 wherein each discrete cavity has an inner wall conforming generally to a cylindrical section, an outer wall conforming generally to a cylindrical section, and two end walls.

4. The roofing washer of claim 3 wherein each end wall defines a plane oriented at an acute angle relative to a radial plane.

5. The roofing washer of claim 3 wherein each end wall defines a plane displaced from a radial plane by an acute angle, in a counterclockwise sense when the roofing washer is viewed from above.

6. The roofing washer of claim 1 molded entirely from the resilient, polymeric material.

7. A washer as set forth in claim 1, wherein:

said plurality of cavities comprises five cavities equiangularly disposed about said longitudinal axis of said washer.

8. A washer as set forth in claim 7, wherein: p1 said non-radially extending ribs comprises five ribs interposed between said five cavities.

9. A washer as set forth in claim 1, further comprising:
an annular metal portion annularly surrounding said polymeric central portion and including a bowl-shaped portion within which said polymeric central portion is fixedly disposed.

10. A washer as set forth in claim 9, wherein:
said annular metal portion is fabricated from galvanized steel.

11. A washer as set forth in claim 1, wherein:
said central portion is fabricated from polypropylene.

12. A roofing washer useful with a fastener having a head and a shank, comprising:
a central portion molded from a resilient, polymeric material;
a central socket defined within said central portion and having a lower wall and a lateral wall, and defining a longitudinal axis, said lower wall having an axial aperture configured so as to permit said shank of said fastener to extend through said axial aperture but not to permit said head of said fastener to pass therethrough, said lateral wall enclosing said central socket and defining an annular lip constituting means for engaging said head of said fastener when said fastener is driven with said shank of said fastener extending through said axial aperture, for being radially expanded as said head of said fastener is driven past said annular lip, and for restraining said head of said fastener, after said head of said fastener has been driven past said annular lip, so as to limit backward movement of said fastener relative to said roofing washer;
an integral, annular web, which extends radially inwardly from said annular lip and which constitutes means for overlying portions of said head of said fastener when said head of said fastener is disposed within said central socket with said shank of said fastener extending through said central aperture; and
a plurality of discrete cavities arranged within a regular pattern around said central socket and spaced radially outwardly from said central socket by means of said annular lip, said discrete cavities being separated from each other by means of ribs having non-radially extending side portions which interconnect said annular lip to said central portion for facilitating radial expansion of said annular lip by accommodating portions of said annular lip, as said head of said fastener is driven past said annular lip with said shank of said fastener extending through said axial aperture, said annular lip being reinforced by said ribs defined between said cavities.

13. The roofing washer of claim 12 molded entirely from the resilient, polymeric material.

14. The roofing washer of claim 12 wherein each discrete cavity has first, second, and third walls, the first and second walls being planar and meeting at an acute angle.

15. The roofing washer of claim 6 wherein the third wall is curved about an axis coaxial with the axis defined by the lateral wall.

16. The roofing washer of claim 14 wherein each discrete cavity is symmetrical with respect to a radial plane intersecting the first and second walls of such discrete cavity where the first and second walls thereof meet at the acute angle.

17. The roofing washer of claim 16 wherein the annular lip is defined by annular surfaces of the lateral wall, said surfaces including an upper, frusto-conical surface flaring upwardly, a lower, generally cylindrical surface extending upwardly from the lower wall, and an intermediate surface between the upper and lower surfaces.

18. A washer as set forth in claim 12, wherein:
said plurality of cavities comprises six cavities equiangularly disposed about said longitudinal axis.

19. A washer as set forth in claim 12, wherein:
said cavities have a substantially triangular configuration.

20. A roofing washer useful with a fastener having a head and a shank, comprising:
a central portion molded from a resilient, polymeric material;
a central socket defined within said central portion and having a lower wall and a lateral wall, and defining a longitudinal axis, said lower wall having an axial aperture configured so as to permit said shank of said fastener to extend therethrough while preventing said head of said fastener to pass therethrough, said lateral wall enclosing said socket and defining an annular lip constituting means for engaging said head of said fastener when said fastener is driven with said shank of said fastener extending through said axial aperture, for being radially expanded as said head of said fastener is driven past said annular lip, and for restraining said head of said fastener, after said head of said fastener has been driven past said annular lip, so as to limit backward movement of said fastener relative to said roofing washer; and
a plurality of discrete cavities arranged within a regular pattern around said central socket and spaced radially outwardly from said central socket by means of said annular lip, said discrete cavities being separated from each other by means of ribs having non-radially extending side portions which interconnect said annular lip to said central portion for facilitating radial expansion of said annular lip by accommodating portions of said annular lip, as said head of said fastener is driven past said annular lip with said shank of said fastener extending through said axial aperture, said annular lip being reinforced by said ribs defined between said cavities.

21. A washer as set forth in claim 20, wherein:
said central portion is fabricated from polypropylene.

22. The roofing washer of claim 21 comprising an integral, annular web, which extends radially from the annular lip, and which constitutes means for overlying portions of the head when the head is contained by the central socket with the shank extending through the axial aperture.

23. A washer as set forth in claim 21, further comprising:
an annular metal portion annularly surrounding said central portion and including a bowl-shaped portion within which said central portion is fixedly disposed.

24. Washer as set forth in claim 23, wherein:
said metal portion is fabricated from galvanized steel.

* * * * *